United States Patent [19]

Farrar

[11] Patent Number: 5,728,339
[45] Date of Patent: Mar. 17, 1998

[54] IN-LINE SILICONE COATED POLYESTER FILM AND A PROCESS FOR COATING THE FILM

[75] Inventor: Grover L. Farrar, Greenville, S.C.

[73] Assignee: Hoechst Celanese Corporation, Somerville, N.J.

[21] Appl. No.: 601,587

[22] Filed: Feb. 14, 1996

Related U.S. Application Data

[62] Division of Ser. No. 773,323, Oct. 11, 1991, abandoned.

[51] Int. Cl.⁶ .......................... B29C 55/04; B29C 55/14
[52] U.S. Cl. .......................... 264/134; 427/379; 427/387; 427/393.5; 264/171.13; 264/210.5
[58] Field of Search ...................... 427/379, 387, 427/393.5; 264/134, 129, 290.2, 171.13, 210.5

[56] References Cited

U.S. PATENT DOCUMENTS

| | | | |
|---|---|---|---|
| 3,057,792 | 10/1962 | Settineri | 428/40 |
| 3,427,270 | 2/1969 | Northrup | 260/29.1 |
| 3,691,206 | 9/1972 | Northrup | 260/348 SC |
| 3,928,690 | 12/1975 | Settineri | 428/40 |
| 4,239,973 | 12/1980 | Kolbe | 250/531 |
| 4,378,389 | 3/1983 | Maruyama et al. | 427/387 |
| 4,486,281 | 12/1984 | Pigeon | 204/159.13 |
| 4,822,687 | 4/1989 | Kessel | 428/447 |
| 4,851,166 | 7/1989 | Kendell | 264/22 |
| 5,069,942 | 12/1991 | Anderson | 427/387 |
| 5,073,588 | 12/1991 | Seltmann et al. | 524/264 |
| 5,077,353 | 12/1991 | Culbertson | 525/446 |

FOREIGN PATENT DOCUMENTS

| | | |
|---|---|---|
| 1120176 | 3/1982 | Canada . |
| 58/171916 | 10/1983 | Japan . |
| 59-120664 | 7/1984 | Japan . |
| 62-240363 | 10/1987 | Japan . |

*Primary Examiner*—Erma Cameron
*Attorney, Agent, or Firm*—Gregory N. Clements

[57] ABSTRACT

A silicone release film including an oriented polyester film having a coating thereon in an amount sufficient to act as a silicone release film. The aqueous coating comprises glycidoxy silane and an aqueous based thermosetting silicone release composition. The minimum amount of glycidoxy silane present in the coating is at least 1.0% by weight of the silicone solids. Typical glycidoxy silanes are glycidoxypropyltrimethoxysilane or glycidoxypropyltriethoxysilane. A process for coating a polyester film with a silicone coating is also disclosed, where the coating occurs in-line, during the manufacturing process for the film before it is heat-set.

7 Claims, No Drawings

IN-LINE SILICONE COATED POLYESTER FILM AND A PROCESS FOR COATING THE FILM

This application is a divisional of application Ser. No. 07/773,323, filed Oct. 11, 1991 now abandoned.

BACKGROUND OF THE INVENTION

1) Field of the Invention

The present invention concerns silicone coated release films which are particularly used as a temporary support substrate for an adhesive coated article. Examples of such are adhesive labels, adhesive shelf paper, removable lidding for microwavable food containers, and peel-off labeling stickers. In particular, the present invention relates to a temporary substrate made of polyester which has been in-line coated with an aqueous silicone resin system. More particularly, the present invention coats the polyester film with a blend of an aqueous silicone resin system and glycidoxy silane. A process for coating a polyester film is also disclosed.

2) Prior Art

Polyester film is generally made by extruding an amorphous melt of polyester onto a polished casting drum which is cooled to solidify the melt into sheet form. The sheet then undergoes a stretching operation which aids in crystallizing the film, thus giving it strength and other physical properties. After the film has been stretched in one or more directions, the film is generally heat-set at a temperature higher than the temperature at which it is stretched. Heat setting serves to lock-in the properties of the polyester. The manufacturing process for producing polyester film is well known in the art and need not be further explained herein.

Silicone coated release substrates are known, particularly in applications where the substrate is paper. It is important that the silicone coated release substrate permit an adhesive backed article to minimumly adhere to it, thereby serving as a temporary support. On the other hand, the substrate must also release the adhesive backed article with a minimum of effort, and yet not transfer silicone coating to the adhesive (called migration), thereby preventing it from adhering to the final substrate. Silicone coated release substrates are most frequently produced by coating the substrate with a solvent or solventless based silicone resin composition. As the silicone resin composition dries, it adheres to the substrate.

It is known to both off-line and in-line coat polyester film. Off-line coating occurs when the film is coated after the heat-setting stage and usually not by the manufacturer. In-line coating is done during the manufacturing stage, typically before or after one stretching operation, and before heat-setting the film. Again, both off-line and in-line coating processes are known.

U.S. Pat. No. 4,851,166 to Kendall discloses a polymeric film (polypropylene film) which has been in-line coated with a heat curable, non-aqueous silicone resin composition. This reference also discloses that the polymeric film may be polyester film and that the film is coated prior to the stretch orientation stage.

Japanese patent 58/171916 to Kori also teaches a polypropylene film which is in-line coated, prior to orientation of the film, with a heat curable non-aqueous silicone resin composition.

The Kendall and Kori patents employ a solventless silicone resin system. Employing a solventless silicone resin system has economic disadvantages compared with solvent or aqueous based silicone resin systems. The chief difference is that solvent and aqueous based systems can be applied much thinner than a solventless system. Thus, the generally thicker coating of a solventless resin system is more expensive. Additionally, neither Kendall-nor Kori employ an adhesion promoting additive, which as demonstrated later in the Examples, generally will result in rub-off. Silicone release coatings having a tendency to rub-off are difficult to further process since contact with rollers during winding, for example, may rub-off the coating.

Canadian patent 1,120,176 to Hockemeyer discloses an aqueous based silicone resin system which can be coated upon plastic foil substrates for release film applications (referred to in this patent as adhesive repellant coatings). This patent is the only known prior art which suggests that an aqueous based silicone resin system can be employed for an adhesive repellant or silicone release coating composition on polymeric substrates. Aqueous based silicone resin compositions known to the inventor are employed as release agents on paper substrates.

The Canadian patent discloses an adhesive repellant coating composition which is applied to the surface of a substrate as an aqueous emulsion consisting of: 1) diorganopolysiloxanes having silicon bonded vinyl groups in their terminal units; 2) from 20 to 50% by weight of organopolysiloxanes having at least three silicon bonded hydrogen atoms per molecule based upon the weight of the diorganopolysiloxane; and 3) a catalytic amount of catalyst (such as platinum) which promotes the addition of silicon bonded hydrogen to vinyl groups. Preparation of the aqueous based silicone resin system is adequately explained in the Canadian reference and this reference is incorporated herein by specific reference.

While the aqueous based silicone resin composition disclosed in the Canadian patent does provide some desirable properties in silicone release applications, it does not provide adequate protection against rub-off and migration, and provide good release results on polymeric film. Protection against migration and obtaining good release were previously discussed. Adequate protection against rub-off is desired when further processing of the film is contemplated, particularly where the film will be in contact with rollers and winders.

U.S. Pat. No. 3,427,270 to Northrup discloses a non-aqueous (i.e., solvent based) silicone resin composition useful as a release agent and adhesion promoting silanes. The non-aqueous silicone resin composition states that two silane ingredients are necessary for adequate adhesion of the silicone coating on a cellulosic substrate (the only substrate mentioned). The two components consist of an epoxysilane and an alkylsilane which is monovalent hydrocarbon radical having no more than three carbon atoms. As disclosed by this reference, the epoxysilanes by themselves do not give reproducible results when employed as adhesion promoters for silicone release agents. To overcome this problem, a second component of alkyl silane is needed.

There continues to be a need in the art for an aqueous based silicone release coating system which is compatible with polymeric substrates, particularly polyester substrates, and provides excellent rub-off resistance, protection against migration, and good release such that further handling of the film does not disrupt the silicone coated release composition.

SUMMARY OF THE INVENTION

The present invention provides an aqueous based emulsion coating composition capable of being applied to polyester substrates, which yields greatly improved rub-off and migration resistance and also is excellent in silicone release applications.

In the broadest sense, the present invention relates to a silicone release film including an oriented polyester film having a coating thereon in an amount sufficient to act as a silicone coated release film, said coating comprising glycidoxysilane intimately and uniformly mixed with an aqueous based silicone release composition.

In the broadest sense of the present invention, a process is also contemplated for coating a film comprising the steps of extruding an amorphous melt of polyester onto a chilled casting drum; orienting the film in one or more directions; coating said film before or after said orientation with a coating sufficient to perform as a release coating; and heat setting said coated film, wherein said coating consists of a uniform mixture of a glycidoxysilane and an aqueous based silicone release composition.

DESCRIPTION OF THE PREFERRED EMBODIMENTS OF THE INVENTION

The polyester film of the present invention can be manufactured from various polyester resins. Polyethylene terephthalate, polytetramethylene terephthalate, polyethylene 2,6-naphthalate, and polyethylene-1,4-cyclohexylene dimethylene terephthalate are examples of suitable homopolymers which may be employed in the practice of the present invention. Polyester copolymers may also be used. Possible copolyesters include polyethylene terephthalate/isophthalate, polyethylene terephthalate/adipate, polyethylene terephthalate/sebacate, and polyethylene terephthalate/sulphoisophthalate. Polyethylene terephthalate homopolyester is preferred.

The polyester film may also include other polymers so long as the film has a polyester content greater than about 85% by weight. For example, a blend of polyester and polyolefin, such as polyethylene terephthalate/polyethylene, or a blend of polyester and polyamide, such as polyethylene terephthalate and nylon would be suitable.

The polyester film of the present invention can be manufactured by an extrusion process. Polyester resin is first heated to a molten state and then extruded through a wide slot die in the form of an amorphous sheet. The sheet-like extrudate is rapidly cooled or quenched to form a cast sheet of polyester by extruding the amorphous sheet around a polished, revolving chilled casting drum. The cast polyester sheet can then be stretched in one or more directions, while being heated to a temperature in the range of from about 80° C. to 160° C., preferably 90° C. to 100° C. The degree of stretching may range from about three to five times the original cast sheet unit dimension, preferably about three to four times the original cast sheet dimension. Preferably, the polyester film is biaxially oriented (stretched in both the machine direction and the transverse direction) rather than uniaxially oriented.

Prior to coating the polyester film surface with the coating of the present invention, the film may be surface-treated in a conventional manner by exposure to an electric corona discharge. Electric corona discharge is a conventional surface treatment which is commonly performed on polyester films to enhance the film's wetting property. Electric corona discharge methods and apparatus are described in U.S. Pat. Nos. 3,057,792 and 4,239,973.

For uniaxially oriented film, the corona treatment followed by the coating application may occur during the in-line manufacturing process, either before stretch orientation or after stretch orientation. If the corona treatment followed by the coating occurs before stretch orientation, heating the film before stretch orientation will usually drive off the water in the coating. If the corona treatment and coating for uniaxially oriented film occurs after the stretch orientation during the in-line manufacturing process, it is necessary to completely dry the film before winding the film. Heat-setting the film to lock-in the physical properties also is generally sufficient to dry the film before winding. For uniaxially oriented film, the preferred procedure is to corona treat and coat the film before stretch orientation.

For biaxially oriented film, the corona treatment followed by the coating may occur during the in-line manufacturing process either before stretch orientation, or between the machine draw and the transverse draw of biaxial stretch orientation, or after stretch orientation. Again, if the corona treatment and coating step occur after stretch orientation is complete, it is preferred that the film be completely dry before winding. Moreover, the biaxially oriented film must be heat sat to lock-in the physical properties and this is generally sufficient to dry the film before winding. If the corona treatment or coating occurs before orientation, or between draws during orientation, the latter orientation steps are generally sufficient to drive off the water from the coating. Preferably, for biaxially oriented film the corona treatment and subsequent coating occur between draws during the stretch orientation stage.

The polyester sheet is coated on the electric corona discharge treated surface with the coating of the present invention whose composition will be described below. The coating composition may conveniently be applied as an aqueous emulsion using any of the well known coating techniques. For example, the film may be coated by roller coating, spray coating, gravure coating, reverse gravure coating, or slot coating. The heat applied to the film during the subsequent preheating, stretching and heat-setting stages is generally sufficient to evaporate the water and cure and bind the coating to the polyester film.

The oriented polyester film, whether uniaxially oriented or biaxially oriented, is generally heat-set at a temperature ranging from 190° C. to 240° C., preferably from 215° C. to 235° C. The coated oriented polyester film is then wound into a roll for further processing or shipping.

The coating is generally prepared by hydrolyzing the glycidoxy silane in deionized water and blending with an aqueous silicone resin emulsion and its corresponding crosslinker. Generally the aqueous silicone resin compositions are platinum catalyzed. However, condensation type siloxanes may be employed and the emulsion may be catalyzed with a tin catalyst. The crosslinker employed is that recommended by the particular silicone resin composition manufacturer for the specific aqueous silicone resin composition.

Some suitable aqueous based silicone resin compositions are:

1) Wacker Silicone (Adrian, Michigan) aqueous based 400E silicone resin composition comprising methyl vinyl polysiloxane and platinum with the V20 crosslinking system comprising methyl hydrogen polysiloxane;

2) Dow Corning (Midland, Mich.) X2-7720 aqueous silicone resin composition comprising methyl vinyl polysiloxane and methyl hydrogen polysiloxane with the X2-7721 crosslinking system comprising platinum polysiloxane;

3) PCL (Phone-Poulenc Inc., Rock Hill, S.C.) PC-105 aqueous based silicone resin composition comprising methyl vinyl polysiloxane and methyl hydrogen polysiloxane with the catalyst component of PC-95 comprising platinum polysiloxane;

4) PCL PC-107 aqueous based silicone resin composition (similar to PC 105) with the above-identified PC-95 crosslinker; and 5) PCL PC-188 aqueous based silicone resin composition (similar to PC 105) with the above-identified PC-95 crosslinker.

The amount of deionized water blended with the aqueous silicone resin composition is dependent upon the coating method and desired amount of solids, by weight, to be coated on the polyester film.

The glycidoxy silane may be a glycidoxypropyltrimethoxysilane or generally any glycidoxysilane represented by the formula

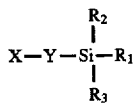

wherein X is a glycidoxy group, Y is an alkylene group, such as methylene, ethylene, propylene, etc., R1, R2 and R3 are hydrolyzable groups, such as methoxy, ethoxy, acetoxy, and the like. These silanes possess water solubility or water dispersibility.

The solids level of the coating may be from about 3% to about 30% by weight solids. Preferably, the percent solids, by weight, is from about 5% to about 15%. While it may be possible that a solids concentration below 3% by weight for the coating may be effective, it is believed that such a level would be minimally effective. Additionally, while a solids level greater than 30% by weight may be effective, it is believed that at such a level, a haze may result in the film, or the coating is more expensive but no more effective than a film having a solids level in the preferred range, for example.

As previously mentioned, the coating consists of the aqueous thermosetting silicone resin composition, including any necessary crosslinkers, etc., and the glycidoxy silane. The minimum amount of glycidoxy silane believed to be effective for an aqueous silicone resin composition in the present invention is about 1.0% by weight of the silicone solids. At the preferred coating solids level of about 5% to about 15% by weight, the glycidoxy silane concentration in solution is from about 0.5% to about 1.5%, by weight. On a dry weight basis, the glycidoxy silane is preferably from about 3% to about 30% of the silicone solids. Using much more than about 30% by weight of the glycidoxy silane on a dry weight basis is expensive and may not yield results beyond expected results.

The thickness of the coating is from about 0.02 lb./ream to about 0.10 lb./ream. Generally a thickness less than the above amount is not effective as a release coating, while a thickness more than the above amount is not cost effective.

GENERAL EXPERIMENTAL CONDITIONS

In the following Examples a gamma-glycidoxypropyltrimethoxysilane is employed where indicated in the coating composition. The structure of this glycidoxysilane is set forth below.

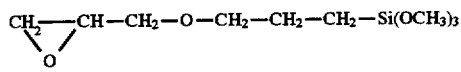

The following tests were conducted on the film as indicated.

1) Smear—measured by rubbing the index finger once across the silicone coated surface and observing for haze; indicates curing of the silicone coating. Smear conducted beyond 7 days may be indicating blooming (to the surface) of other components, rather than curing.

2) Rub-off—measured by rubbing the index finger back and forth across the silicone coated surface and testing for differential release by applying a piece of 3M 610 tape on both the rubbed and unrubbed areas and peeling the tape from the film. The rub-off test indicates the adhesion of the silicone coating to the polyester film.

3) Re-adhesion test—Tesa 4154 tape is pressed against the silicone coated surface of the film and then pulled from the surface. Then the adhesive surface of the Tesa 4154 tape is placed against a clean stainless steel surface. The adhesive tape is pulled at a 180° angle from the steel surface and the force required to move it is measured. "Virgin" tape is used as the control. The film passes the test if its re-adhesion is 70% of the control tape. In this experiment, the virgin tape had a peel value of about 0.8 lbs. per inch.

4) Migration—is conducted by pressing 3M's 610 adhesive tape against the silicone coated surface. The tape is then removed and the adhesive side of the tape pressed against itself by doubling the tape up. The tape is then pulled apart from itself. If the tape has lost its "adhesiveness", it fails this test. The test is rated subjectively against virgin 610 tape. This indicates that the silicone release coating has transferred from the coated film to the adhesive tape if it fails the test.

The subjective rating of the smear test is: 1=no haze change; 2=very slight haze change; 3=slight haze change; 4=distinct haze change; 5=very distinct haze change; and 6=severe haze change.

The subjective rating on the rub-off test with respect to the difference in release employing the 610 tape from the film where rubbed versus the film not rubbed is: 1=no change in release; 2=very slight change in release; 3=slight decrease in release; 4=distinct decrease in release; 5=very distinct decrease in release; and 6=very poor release, indicating the silicone coating rubbed off and the tape was not easily released from the polyester film.

EXAMPLE 1

A HOSTAPHAN® 2000 type polyester film produced by the Hoechst Celanese Company was in-line coated during the manufacturing process of the film with a thermosetting aqueous based silicone emulsion supplied by Wacker Silicones having the following formulation: 77 parts deionized water; 20 parts silicone emulsion 400E; and 3 parts crosslinker V72. The silicone emulsion 400E is a methylpolysiloxane having vinyl groups. It contains a platinum catalyst and an inhibitor to prevent premature reaction when crosslinker is added. The crosslinker is a methylhydrogenpolysiloxane emulsion which reacts with the double bond in the vinyl group in the methylpolysiloxane. The smear and rub-off test results were measured after 8 and 30 days and the glycidoxy silane level, when employed, was 1½% by weight of the emulsion coating. The thickness of the HOSTAPHAN® 2000 film was either 48 gauge or 142 gauge as indicated.

In samples 1 and 3, there was 0% silane and the film employed was 48 gauge thick. In Samples 2 and 4, 1½% of silane was employed in the coating and again a 48 gauge film was employed. In samples 5 and 7, no glycidoxysilane was employed and the thickness of the film was 142 gauge film. In samples 6 and 8, a 1½% by weight glycidoxysilane was employed in the coating and the film in each instance was 142 gauge film. The results are set forth in Table 1 below.

TABLE 1

| Sample No. | Smear(1) | | Rub-off(2) | |
| --- | --- | --- | --- | --- |
| | 8 day | 30 day | 8 day | 30 day |
| 1 | 6 | 6 | 5 | 6 |
| 2 | 4 | 2 | 2 | 1 |
| 3 | 4 | 6 | 3 | 6 |
| 4 | 1 | 1 | 1 | 1 |
| 5 | 5 | 6 | 4 | 6 |
| 6 | 1 | 1 | 1 | 1 |
| 7 | 5 | 6 | 3 | 3 |
| 8 | 1 | 2 | 1 | 1 |

Samples 2, 4, 6 and 8, all of which had 1½% by weight glycidoxysilane show good smear results and good rub-off results even after 30 days on both 48 gauge and 142 gauge film. These results clearly indicate that the glycidoxysilane, by itself, as an additive to the aqueous silicone thermosetting composition improves the smear and rub-off.

EXAMPLE 2

In this Example, the thickness of the coating was varied, along with the glycidoxysilane level. Table 2 illustrators the results of smear and rub-off when varying the silicone coating solids, in percent by weight, from 5.5% to 22%. Likewise, the glycidoxysilane as a percentage of the total coating formulation, ranges from 0 to 1.5% by weight. The results of Table 2 are set forth below.

TABLE 2

SMEAR AND RUB-OFF DATA

| Sample No. | Silicone Coating Solids, % | Silane level(1) | Smear(2) | | Rub-off(3) | |
| --- | --- | --- | --- | --- | --- | --- |
| | | | 7 day | 30 day | 7 day | 150 day |
| 1 | 5.5 | 0 | — | YES | YES | YES |
| 2 | 5.5 | 1.8 | — | YES | YES | NO |
| 3 | 5.5 | 5.5 | — | NO | NO | NO |
| 4 | 5.5 | 9.1 | — | NO | NO | NO |
| 5 | 5.5 | 18.0 | — | NO | NO | NO |
| 6 | 5.5 | 27.0 | — | NO | NO | NO |
| 7 | 11.0 | 0 | — | YES | YES | YES |
| 8 | 11.0 | 0.9 | — | YES | NO | YES |
| 9 | 11.0 | 2.7 | — | YES | NO | NO |
| 10 | 11.0 | 4.5 | — | YES | NO | NO |
| 11 | 11.0 | 9.0 | — | YES | NO | NO |
| 12 | 11.0 | 13.6 | — | NO | NO | NO |
| 13 | 22.0 | 0 | — | * | YES | * |
| 14 | 22.0 | 0.5 | — | YES | YES | YES |
| 15 | 22.0 | 1.4 | — | NO | NO | NO |
| 16 | 22.0 | 2.3 | — | NO | NO | NO |
| 17 | 22.0 | 4.5 | — | YES | NO | NO |
| 18 | 22.0 | 6.8 | — | YES | NO | NO |

*Sample lost.
(1)As percentage of silicone.
(2)Rub briskly with the index finger and observe for haze.
(3)Rub briskly with the index finger and check rubbed area with 610 tape.

EXAMPLE 3

In Example 3, different aqueous thermosetting resin compositions were compared. The amount of glycidoxysilane in each sample being the same, i.e., 1.5% by weight based on the total coating emulsion.

In this Example, each coating composition was applied either in-line (during the manufacturing process of the polyester film, before the film was heat-set), or off-line (after the polyester film has been manufactured and heat-set). Generally, a more uniform, yet thinner coating results during in-line coating process, versus an off-line coating process.

In this Example, Wacker Silicone's aqueous thermosetting silicone resin composition 400E with crosslinker V20 was compared with Dow Corning's X2-7720 with the crosslinker X2-7721, which was compared with PCL's PC-105 with a crosslinker PC-95, which was compared with PCL's PC-107 with a crosslinker PC-95; which was compared with PCL's PC-188 which was crosslinked with PC-95. The specific formulations are set forth below.

| Sample 1 | Wacker Silicone Formulation (about 12% silicone solids) | |
| --- | --- | --- |
| | 400E Silicone Emulsion | 20 parts |
| | Deionized water | 75.5 parts |
| | V20 Crosslinker | 3 parts |
| | Glycidoxy silane | 1.5 parts |
| Sample 2 | Dow Corning Formulation (about 11% silicone solids) | |
| | X2-7720 Emulsion Coating | 12.5 parts |
| | X2-7721 Catalyst Emulsion | 12.5 parts |
| | Deionized water | 73.5 parts |
| | Glycidoxy silane | 1.5 parts |
| Sample 3 | PCL PC-105 Formulation (about 10% silicone solids) | |
| | PC-105 Silicone Emulsion | 20 parts |
| | Deionized water | 76.5 parts |
| | PC-95 Catalyst | 2 parts |
| | Glycidoxy silane | 1.5 parts |
| Sample 4 | PCL PC-107 Formulation (about 10% silicone solids) | |
| | PC-107 Silicone Emulsion | 20 parts |
| | Deionized water | 76.5 parts |
| | PC-95 Catalyst | 2 parts |
| | Glycidoxy silane | 1.5 parts |
| Sample 5 | PCL PC-188 Formulation (about 10% silicone solids) | |
| | PC-188 Silicone Emulsion | 20 parts |
| | Deionized water | 76.5 parts |
| | PC-95 Catalyst | 2 parts |
| | Glycidoxy silane | 1.5 parts |

Each of the sheets were corona treated sufficient to "wet-out" the coating on the sheets. The power level is approximately 2.5 watts/sq.ft./min of the treated film. The sheets were off-line coated with a No. 8 Meyer rod and dried in a forced air oven at 120° C. from between 30 seconds to 1 minute. It is believed that these drying conditions closely simulate the drying conditions which occur in an off-line machine coating process.

The off-line coating thickness for each of the formulations is set forth below.

Sample 1=0.17 lb. per ream (a ream equals 3000 square feet).

Sample 2=approximately 0.03 lb. per ream (poor quality coating did not wet well on the polyester sheet, even with corona treatment).

Sample 3=approximately 0.03 lb. per ream (poor quality coating did not wet well on the polyester sheet).

Sample 4=0.17 lb. per ream.

Sample 5=0.12 lb. per ream.

Normal off-line coating thicknesses are generally expected to be in the range of 0.2 to 0.7 lb. per ream.

The in-line coating thickness for each sample was more uniform; and about 0.05 lb./ream. The heat-setting condition for the in-line process was about 220° C. for about 7 seconds.

The results of this Example are set forth in Table 3 and migration and re-adhesion were tested at both 1 day and 7 day levels.

TABLE 3

COMPARISON OF IN-LINE AND OFF-LINE
SILICONE COATED FILMS
MIGRATION(1)
RE-ADHESION(2)

| Sample No. | 1 day Migration | 7 days Migration(3) | 1 day Re-adhesion (lbs./in.) | 7 days Re-adhesion (lbs./in.)(4) |
|---|---|---|---|---|
| 1 (ILC) | — | no | — | 1.1 |
| 1 (OLC) | no | yes | 0.70 | 0.69 |
| 2 (ILC) | — | no | — | 1.1 |
| 2 (OLC) | no | yes | 0.73 | 0.83 |
| 3 (ILC) | — | no | — | 0.90 |
| 3 (OLC) | no | yes | 0.13 | 0.30 |
| 4 (ILC) | — | no | — | 0.90 |
| 4 (OLC) | yes | yes | 0.47 | 0.53 |
| 5 (ILC) | — | no | — | 1.12 |
| 5 (OLC) | yes | yes | 0.12 | 0.27 |

(1)The migration test is conducted by pressing 3M's 610 adhesive tape against the silicone coated surface, removing the tape, pressing the adhesive side against itself and pulling apart. If the tape has lost its "adhesiveness", it fails this test. The test is rated subjectively against "virgin" 610 tape.
(2)In the re-adhesion test, Tesa 4154 tape is pressed against the silicone coated surface, then peeled from the surface and the adhesive surface placed against a clean stainless steel surface. The adhesive tape is pulled at a 180° angle from the steel and the force required to remove it measured. "Virgin" tape is used as a control. The film passes the test if its re-adhesion is 70% of the control tape. In this experiment the virgin tape had a peel value of about 0.8 lbs./in.
(3)Migration and re-adhesion for the in-line coated (ILC) films were after 30 days.

As Table 3 illustrates, a variety of aqueous silicone thermosetting resin compositions are within the scope of the present invention. It is noted, that best results for these various aqueous thermosetting silicone resin compositions occur when the coating composition is applied in-line.

Thus it is apparent that there has been provided, in accordance with the invention, a polyester film coated with an aqueous silicone resin composition and a glycidoxy silane, and a process for coating such a film . . . that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. A process for coating a film comprising the steps of:
 a) forming a polyester film;
 b) drawing said polyester film;
 c) coating said film, in-line, with an effective amount of a coating sufficient to release an adhesive backed article from said coating, said coating comprising an aqueous based thermosetting silicone resin composition and at least 1.0% by weight of silicone solids of a glycidoxy silane;
 d) drying said coating; and
 e) heat-setting said coated film.

2. The process of claim 1 wherein said coating is from about 3% to about 30% by weight solids.

3. The process of claim 1, wherein said dried coating is from about 0.02 lb./ream to about 0.10 lb./ream.

4. The process of claim 1, wherein said glycidoxy silane is present in an amount no more than about 30% by weight of the silicone solids.

5. The process of claim 1, wherein said glycidoxy silane is represented by the formula

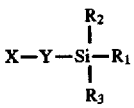

wherein X is a glycidoxy group, Y is an alkylene group, and $R_1$, $R_2$ and $R_3$ are hydrolyzable groups.

6. The process of claim 5, wherein said glycidoxy silane is selected from the group consisting of glycidoxyalkyltrialkoxysilane and glycidoxyalkyltriacetoxysilane.

7. The process of claim 1, wherein after said drying step, the additional step of drawing said polyester film in a direction transverse to the direction of drawing in step (b) occurs.

* * * * *